M. VESICH.
MOTOR CYCLE PROP.
APPLICATION FILED JAN. 5, 1914.
1,137,368.
Patented Apr. 27, 1915.
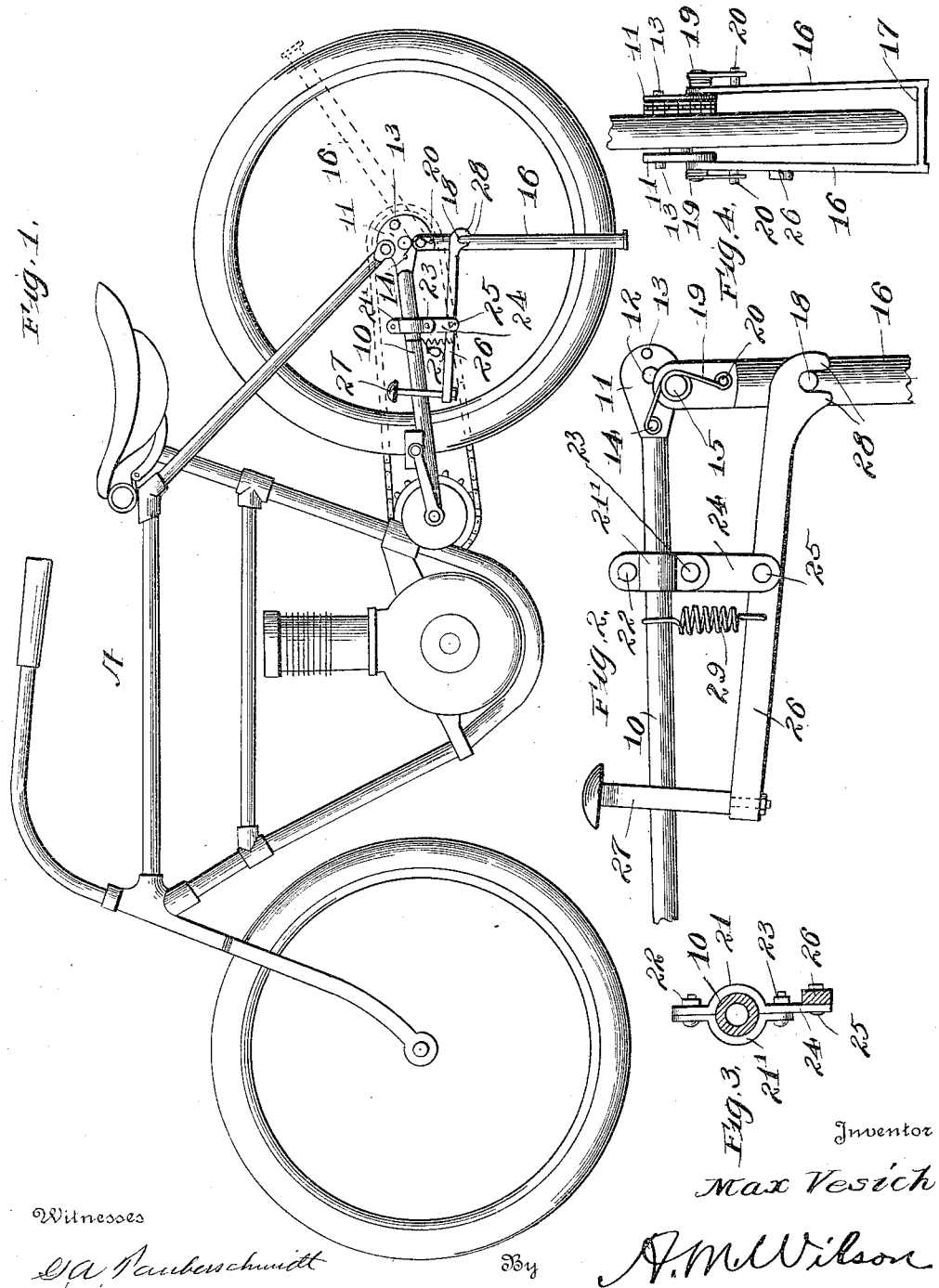
Witnesses
O. A. Tauberschmidt
A. B. Horváth
Inventor
Max Vesich
By A. M. Wilson
Attorney

UNITED STATES PATENT OFFICE.

MAX VESICH, OF CHICAGO, ILLINOIS.

MOTOR-CYCLE PROP.

1,137,368.  Specification of Letters Patent.  Patented Apr. 27, 1915.

Application filed January 5, 1914. Serial No. 810,480.

*To all whom it may concern:*

Be it known that I, MAX VESICH, a subject of the King of Hungary, residing at Chicago, in the county of Cook and State of Illinois, have invented certain new and useful Improvements in Motor-Cycle Props, of which the following is a specification.

This invention relates to certain new and useful improvements in motor-cycle props. An object of the invention is to provide a motor-cycle or bicycle prop, which when not in use is held in an elevated position by a spring coiled about the pivot of the prop.

A further object of the invention is to provide means carried by the base bar of the motor-cycle to engage the prop to hold the same in operative position and to operate said means to cause the prop's axial spring to elevate the lower end of the prop to render the prop inoperative.

A still further object of the invention is to provide a motor-cycle with a supporting prop that will permit a person after having started the engine and while on the machine, to disengage the prop from the ground.

With the above and other objects in view which will appear as the nature of the invention is better understood, the same consists in the novel construction, combination, and arrangement of parts to be hereinafter more fully described and then claimed, reference being had to the accompanying drawing by like characters throughout the several views, and wherein:

Figure 1 is a side elevational view of a motor-cycle embodying my invention. Fig. 2 is an enlarged side elevational view of a portion of the base bar illustrating the mounting of the prop and the operating means therefor. Fig. 3 is a cross-sectional view of the rear bar showing the clamp for supporting the prop operating means and, Fig. 4 is a rear elevational view of a portion of the tire illustrating the prop and its attachment to the base bar.

Referring more specifically to the accompanying drawing, the reference character A indicates a motor-cycle of usual construction embodying the prop to be hereinafter more fully described.

My invention is better illustrated in Fig. 2, which shows the base bar 10 having a radially enlarged end 11. The end 11 is so shaped to provide for the support of the axle of the rear wheel as at 12, preferably centrally thereof, a stop 13 for the prop when the same is in elevated position, and a pin support 14 for the prop operating spring. The end 11 of the base bar 10 has further pivotally-connected thereto as at 15 the prop member. This prop comprises a pair of legs 16, one of each of the legs adapted to be disposed on each side of the tire and connected at their lower ends by the cross-arm 17. One of the legs 16 is provided with a pin 18 extending outwardly from the outer face thereof for purposes to be hereinafter described. Springs 19 are coiled axially of the prop pivot 15 and are connected at their upper ends to the ends of the pivot 15 and at their lower ends to pins 20 carried by the props 16.

The base bar 10 has fixed thereto a clamp member, which is better illustrated in Fig. 3, and comprises the clamping sections 21 and 21' held together and about the bar 10 at their upper ends by bolts 22 and at their lower ends by bolts 23. The clamp section 21 is provided with a depending arm portion 24, and pivotally connected to the arm 24 as at 25 is the lever 26. A foot-operating plunger or pusher 27 is connected to the forward end of the lever 26, while the rear end of said lever is forked as at 28 to engage the pin 18 carried by one of said prop legs. A coil spring 29 is connected at one of its ends to the lever 26, intermediate of the lever pivot 25 and the operating plunger 27 and is connected at its other end to the base bar 10. The spring 29 has a tendency to force the forked end 28 of the lever 26 in a downward direction.

The operation of the device is as follows: When it is desired to support the motor-cycle on the prop legs 16, the prop is lowered from the dotted line position shown in Fig. 1, and pressure brought to bear on the plunger 27 which elevates the forked end 28 and permits the pin 18 carried by the prop to pass under said fork 28, whereupon the pressure is relieved from the plunger 27. During such operation the spring 29 has been partially distended and in exerting itself the fork 28 is forced into engagement with the prop pin 18. After the engine of the motor-cycle has been started, the person while still on the seat, operates the plunger 27 and releases the fork 28 from the prop pin 18, whereupon the axial prop spring 19 exerts itself and moves on the pivot 15, the prop 16 in an upward direction until the prop legs 16 engage the stop pins 13.

The above device is extremely simple in construction, but accomplishes in an efficient manner the advantages claimed therefor, and while I have shown and described the preferred embodiment of my invention, I do not wish to confine myself thereto, as various forms, modifications, and arrangement of parts may be had without departing from the spirit and scope of the invention as claimed.

What I claim as new is:

The combination with the base bar of a motor cycle frame having an enlarged integral radial extension formed with a central bearing for the rear axle of the cycle, a laterally projecting stop-pin, and a prop-pivot, of a prop mounted on said pivot, a spring coiled centrally around said pivot to provide divergent ends one of which is secured to the base bar and the other to the prop, a clamp on said base bar in front of its enlarged rear extension, an arm depending from said clamp, a lever fulcrumed on said arm forked at its rear end, a pin on said prop to be engaged by the fork of the lever, a spring secured at one end to the base bar and at its opposite end to the lever in front of its fulcrum point, and a push-rod at the front end of the lever.

In testimony whereof I affix my signature in presence of two witnesses.

MAX VESICH.

Witnesses:
JOHN PAPP,
GEORGE MILOYEVIEL.

Copies of this patent may be obtained for five cents each, by addressing the "Commissioner of Patents, Washington, D. C."